March 5, 1968      R. B. PITBLADDO      3,372,017

AUTOMATIC TEMPERATURE CONTROL FOR GLASS MOLDING PROCESS

Filed Jan. 7, 1965

$T_{PSP} = 2F\,(T_M + 175) - 700$

Where    $T_{PSP}$ = PLUNGER SET POINT TEMPERATURE
           F = FUNCTION CONTROLLER SETTING (1→0)
           $T_M$ = MOLD TEMPERATURE

INVENTOR
RICHARD B. PITBLADDO

BY      ATTORNEYS

United States Patent Office 3,372,017
Patented Mar. 5, 1968

3,372,017
AUTOMATIC TEMPERATURE CONTROL FOR GLASS MOLDING PROCESS
Richard B. Pitbladdo, Corning, N.Y., assignor to Corning Glass Works, Corning, N.Y., a corporation of New York
Filed Jan. 7, 1965, Ser. No. 424,107
2 Claims. (Cl. 65—162)

ABSTRACT OF THE DISCLOSURE

A method and apparatus for automatically controlling the mold and plunger temperatures in a free glass pressing process so that the glassware does not stick to the plunger when the plunger is removed from the mold. The mold temperature is controlled to maintain it within a desired operating range, and the plunger temperature is controlled as a function of the mold temperature to maintain the plunger temperature at a desired value lower than the mold temperature so that the glassware does not stick to the plunger. The process function which determines the relative plunger temperature may be changed by an adjustable function controller to match the process to the characteristics of the particular article being molded.

This invention relates generally to forming glass articles by a pressing operation in a mold and, more particularly to controlling the temperature of the mold cavity and pressing plunger in such a manner that the formed glass article does not adhere to the plunger when the plunger is withdrawn from the mold cavity.

In the molding of relatively flat glassware, such as soup bowls, dinner plates, etc. a free-pressing process may be used. A gob of hot molten glass is placed in the mold cavity which has a shape corresponding to one surface of the article to be formed. The article is formed by a free-pressing operation wherein a plunger is forced into the mold cavity. The plunger has a shape corresponding to the other surface of the article to be formed.

Both the mold and the plunger become very hot from successive pressing operations. It is a well known problem in the glass pressing art that the formed glassware will stick to either the mold cavity or the plunger if either becomes too hot. Furthermore, extremely high mold and plunger temperatures will cause the glass to remain too plastic, and the formed glassware will be distorted when the plunger is withdrawn after the pressing operation is completed. Prior methods of attempting to overcome this problem rely on merely cooling the mold body and plunger to maintain their temperatures in the optimum range, i.e., low enough so that sticking, due to excessively high temperatures, does not occur, and high enough so that crizzles and checks are not produced in the formed glassware.

However, a problem not overcome by the prior art techniques is the tendency of the molded article to stay on the plunger when the plunger is withdrawn from the mold after the pressing operation, even though the plunger and mold temperatures are both in the optimum range as previously defined. I have found that this problem becomes more acute as the plunger temperature approaches the mold temperature, and, most importantly, I have also found that this tendency for the article to adhere to the plunger is a function of the mold temperature.

In the free-pressing of glass, gravity plays a minor role in determining which piece, i.e., the plunger or the mold body, the glassware will stay with after the pressing operation is completed and the plunger withdrawn. There are three other factors which affect this problem: thermal adhesion, vacuum adhesion, and mechanical adhesion. Thermal adhesion is caused by the tendency of the hot glass to stick to a piece of metal mold equipment, this tendency increasing with increased temperature of the metal. Vacuum adhesion occurs when the glassware conforms very closely with the surface of the metal mold equipment, thus creating a vacuum when one attempts to pull the glassware from the molded surface. Mechanical adhesion is the mechanical shrinkage of the concave surface of the cooling glassware around the expanding convex surface of the mold or plunger, thus actually causing mechanical seizure. These three factors plus the influence of gravity are constantly interacting in determining whether the glassware will remain with the plunger or in the mold as the plunger is withdrawn at the end of a pressing operation.

The present invention overcomes this problem by maintaining the plunger temperature lower than the mold temperature and controlling the plunger temperature as a function of mold temperature so that the molded glassware will stay with the mold when the plunger is withdrawn after a pressing operation. Of course, if it is desired to have the glassware stay with the plunger, then the mold temperature is maintained lower than the plunger temperature and controlled as a function of plunger temperature. This problem is much more severe in the case of free-pressing than in ring-pressing, where, unless very adverse conditions occur, the ring will strip the glassware from the plunger when the plunger is withdrawn.

Consequently, the primary object of this invention is to control the relative temperatures of the mold and plunger in a free-pressing operation so that the molded article will remain with either the mold or with the plunger, as desired, when the plunger is withdrawn from the mold cavity after the pressing operation is completed.

A more specific object of this invention is to sense the mold and plunger temperatures and maintain one of these temperatures at a desirable constant value for efficient molding and automatically control the other temperature so that it remains sufficiently lower than the first temperature, thereby causing the molded article to stay with either the plunger or the mold, depending upon which of the two is hotter, when the plunger is withdrawn from the mold cavity.

Another object is to provide an automatic control system responsive to both the mold and plunger temperatures and which maintains the plunger temperature sufficiently lower than the mold temperature so that a molded article stays in the mold when the plunger is withdrawn from the mold cavity after the completion of a pressing operation.

Other objects and advantages of this system will become apparent from the following written description taken in conjunction with the accompanying drawing which together explain in detail the preferred embodiment of this invention.

Figure 1:
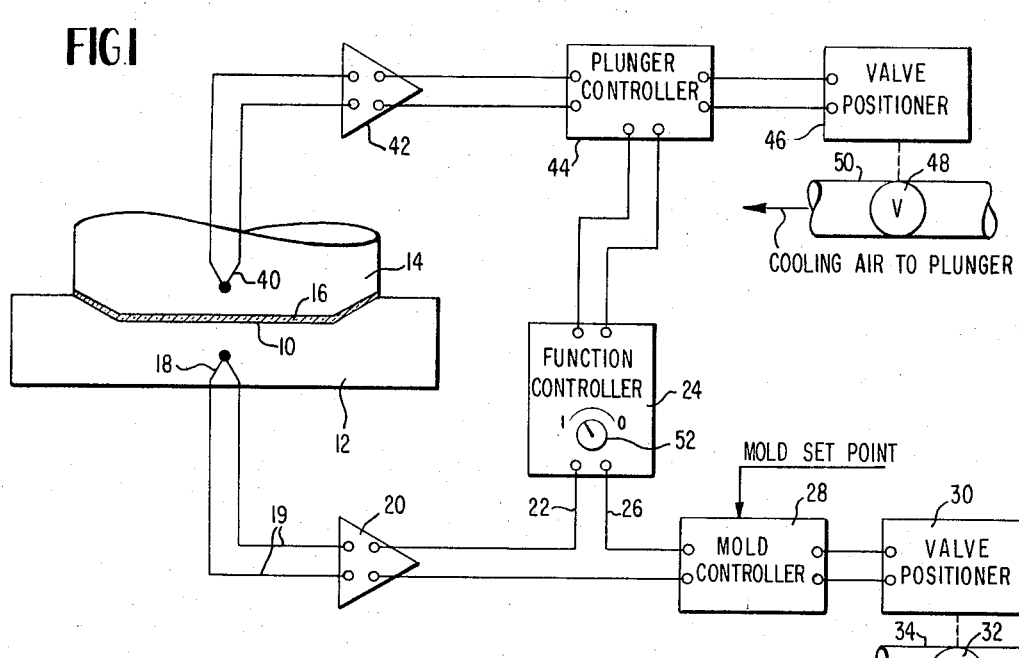
FIGURE 1 shows a system illustrating the preferred method of temperature control.

In FIGURE 1 there is shown molding equipment suitable for use in a free-pressing operation for producing glassware, such as soup bowls, saucers, dinner plates, etc. A gob of hot molten glass is placed in the cavity 10 of a mold body 12 and a plunger 14 is pressed upon the molten glass to form a molded article, such as a dinner plate 16.

Molten glass used in such a process ranges in temperature from 1000 to 1400° C., and after successive pressing operations both the mold and the plunger become very hot. When the mold parts get too hot, the molded article tends to stick to the mold, thereby causing distortions in the molded article and hindering the removal of the article from the mold.

A typical steady-state operating temperature for the mold is approximately 600° C., and this temperature is maintained by passing cooling air to the back of the mold. However, it has been found that if the plunger is merely cooled in the same manner, then as the mold and plunger temperatures approach each other during successive pressings, the molded article will adhere to the plunger when it is withdrawn from the mold cavity. Generally, it is desired that the molded article stay in the mold when the plunger is withdrawn even though in some cases it may be desired to have the molded article stay with the plunger. In any case, it has been found desirable to maintain one of the mold parts substantially cooler than the other, but within the optimum temperature range for producing molded glassware of high quality, thereby causing the molded article to stay with the hotter part when the plunger is withdrawn.

For the purpose of discussion, let us assume it is desired to have the molded dinnerware 16 remain in the mold cavity 10 when plunger 14 is withdrawn after a pressing operation is completed. A thermocouple 18 is embedded in the body of mold 12 to sense the temperature thereof. This thermocouple is a high impedance device which generates a low level voltage signal which is proportional to the temperature being sensed. This signal is applied via conductors 19 to a millivolt amplifier 20 which has a high impedance input and a low impedance output to convert the low level voltage signal into a current signal in the range of 10 to 50 milliamps. For a typical mold temperature of 600° C., the current signal is approximately 45 milliamps for the system of FIGURE 1.

This current signal is fed along a conductor 22 to a function controller 24 and from there along a conductor 26 to a mold controller 28 whose electrical output energizes a valve positioner 30 which mechanically positions a valve 32 controlling the flow of cooling air through a duct 34 which directs the cooling air to mold 12.

The desired or set point mold temperature is manually set into the controller 28 where it is compared with the output of the amplifier 20. The controller itself is a conventional process controller and forms no part of this invention. It operates in such a way that when the temperature sensed by thermocouple 18 exceeds the set point temperature, the electrical output of controller 28 is of such a magnitude and direction as to cause valve positioner 30 to open valve 32 to permit a greater amount of cooling air to be directed upon mold 12.

In like manner, a thermocouple 40 embedded in plunger 14 senses the temperature of the plunger and develops a low voltage signal which is applied to millivolt amplifier 42 to provide a corresponding amplified current signal at the input of plunger controller 44. Another current signal input to plunger controller 44 is derived from the output of function controller 24 which serves to match the hardware used in the system of FIGURE 1 to the process. In effect, the current signal output of the function controller determines the plunger set point temperature, i.e., the temperature at which it is desired to maintain the plunger relative to a given mold temperature in order to produce the best molded glassware and also to prevent the molded article from adhering to the plunger when the plunger is withdrawn from the mold cavity.

When the temperature sensed by thermocouple 40 exceeds the plunger set point temperature current signal from function controller 24, the output signal from the plunger controller energizes a valve positioner 46 to mechanically control a valve 48 located in a cooling air duct 50 which supplies cooling air to plunger 14. In this case, valve 48 would be opened to permit a greater volume of cooling air to pass over the back of the plunger. In the same manner, if for some reason the plunger temperature should drop below the plunger set point temperature, the output signal from plunger controller 44 would be of such a nature that positioner 46 would be energized to close valve 48 to reduce the amount of cooling air flowing through duct 50.

Of course, many devices other than thermocouples may be used to sense the mold and plunger temperatures. I have found pyrometers to be particularly appropriate since they sense the heat energy radiating from the mold parts and provide a temperature signal without physical contact with the mold parts.

Figure 2:
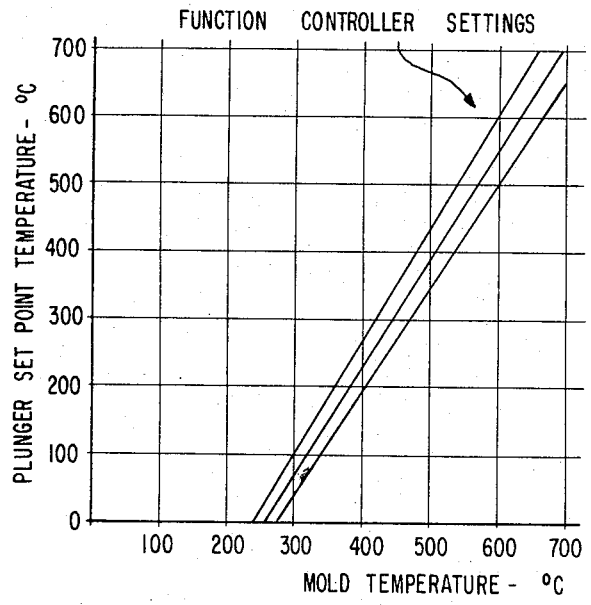
FIGURE 2 is a graph showing a family of curves for various settings of the function controller in FIGURE 1.

FIGURE 2 shows a family of curves showing the relationship between plunger temperature and mold temperature for some actual settings of function controller 24. As a practical manner, during start-up of a pressing operation when the mold is cold, the first several molded articles are discarded because of their poor quality due to the low temperature of the mold and plunger. Under these start-up conditions, the output of plunger controller 44 is of such a nature that valve positioner 46 drives valve 48 to its fully open position so that maximum cooling is applied to the plunger. Even though the curves show the possibility of cooling the plunger to 0°, of course as a practical manner, such cooling is not achieved. The automatic temperature control feature of this system is actually designed to operate when the mold temperature reaches approximately 600° in which case the plunger is cooled to maintain a temperature of 500 to 600° depending on the function controller setting as shown by the curves; however, during the time in which the mold is heating from its initial temperature to 600° C., the control system keeps the plunger temperatures significantly lower than the mold temperature so that the glassware will not stick to the plunger, during the start-up transient.

The actual setting of function controller 24 is controlled by a selector 52 and is determined by the operator in accordance with the particular article being molded. For each different article it may be necessary to vary the steady-state operating temperatures of both the mold and plunger in order to make high quality glassware. This is done by adjusting the mold temperature set point at its controller 28 and selector 52 on function controller 24.

Figure 3:
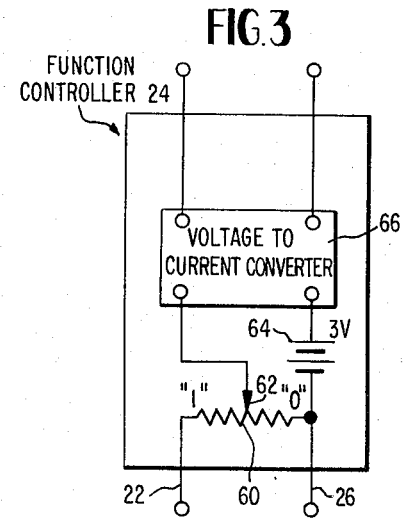
FIGURE 3 is a schematic diagram of one particular type of function controller which may be used in the system of FIGURE 1.

FIGURE 3 shows a suitable function controller 24 which may be used in the system of FIGURE 1. The current signal output of amplifier 20 is passed through a potentiometer resistor 60 which, for the current range of 10 to 50 milliamps actually used in the system is a 200 ohm, ten-turn resistor. Function controller settings correspond to the various positions of the potentiometer slider 62 on resistor 60. These settings are calibrated on the controller in arbitrary units ranging from 1 to 0, respectively, corresponding to the extreme left and right positions of the slider and are set by turning selector 52. The voltage tapped off by slider 62 is bucked against a 3-volt potential provided by a battery 64, the difference in the two voltages being applied to the input of a conventional voltage-to-current converter 66 which produces a current signal having a range of 10 to 50 milliamps as required by plunger controller 44. This current signal is a function of mold temperature, the potentiometer setting and the battery voltage. The current signal from function controller 24 is compared in controller 44 with the current signal output of amplifier 42 to produce a control signal which energizes valve positioner 46 to control the cooling air applied to plunger 14. Consequently, the plunger is maintained at the temperature indicated by the current signal output of function controller 24.

A preferred embodiment of this invention has been described in the foregoing description and illustrated in the attached drawing, but it is specifically contemplated that modifications thereof and additions thereto will be obvious to those skilled in the art, and such modifications and additions are to be considered part of this invention, the scope of which is limited only as defined in the appended claims.

What is claimed is:

1. In a press forming apparatus including a mold having a cavity for receiving a gob of hot molten vitreous material, a plunger adapted to be pressed into the cavity to form an article, and cooling means for cooling the mold and plunger, the improvement comprising:
   (a) first temperature sensing means for sensing the temperature of the mold and producing a mold temperature signal,
   (b) second temperature sensing means for sensing the temperature of the plunger and producing a plunger temperature signal,
   (c) first controller means responsive to said mold temperature signal for controlling said cooling means to maintain the mold temperature in a predetermined range,
   (d) means responsive to said mold temperature signal for producing a function signal, and
   (e) second controller means responsive to both said plunger temperature signal and said function signal for controlling said cooling means to maintain a desired temperature differential between said plunger and said mold so that the molded article will not adhere to the plunger when the plunger is withdrawn from the mold cavity.

2. An improved press forming apparatus as defined in claim 1 further comprising means for varying the value of said function signal in order to vary said desired temperature differential.

References Cited

UNITED STATES PATENTS

| | | | |
|---|---|---|---|
| 2,658,687 | 11/1953 | Southworth | 65—162 X |
| 3,171,731 | 3/1965 | Barger et al. | 65—162 |
| 3,244,497 | 4/1966 | Copeland | 65—162 |
| 2,950,816 | 8/1960 | Arenz | 65—162 X |
| 3,332,765 | 7/1967 | Champlin | 65—355 X |

DONALL H. SYLVESTER, *Primary Examiner.*

F. W. MIGA, *Assistant Examiner.*